United States Patent [19]

Gruber, Jr.

[11] 4,274,605
[45] Jun. 23, 1981

[54] REEL TECHNOLOGY

[76] Inventor: George P. Gruber, Jr., 14930 - 130th St. N., Stillwater, Minn. 55082

[21] Appl. No.: 114,740

[22] Filed: Jan. 24, 1980

[51] Int. Cl.³ .................................................. B65H 75/00
[52] U.S. Cl. ..................................... 242/55; 235/103; 242/57; 242/71.8
[58] Field of Search ................. 242/71.8, 57, 55, 54 R; 116/215, 309; 235/103, 95 C

[56] References Cited

U.S. PATENT DOCUMENTS

| | | | |
|---|---|---|---|
| 1,488,631 | 4/1924 | Berge | 235/96 |
| 2,222,987 | 11/1940 | Perry | 235/103 X |
| 2,506,825 | 5/1950 | Carlson | 235/103 |
| 3,130,907 | 4/1964 | Coffey | 235/95 C |
| 3,198,430 | 8/1965 | Hermann | 235/95 R |
| 3,387,778 | 6/1968 | Althaus | 235/103 X |
| 3,554,036 | 1/1971 | Lawrence | 235/103 X |
| 3,687,397 | 8/1972 | Suzuki et al. | 242/191 |
| 3,779,456 | 12/1973 | Burnett | 235/95 B |
| 3,785,551 | 1/1974 | Regan . | |
| 3,892,354 | 7/1975 | Nagao et al. | 235/91 C |
| 3,986,005 | 10/1976 | Itoh | 235/103 X |
| 4,083,489 | 4/1978 | Borgstrom | 235/95 C |
| 4,101,762 | 7/1978 | Borgstrom | 235/95 C |
| 4,135,713 | 1/1979 | Martin | 272/74 |
| 4,140,899 | 2/1979 | Borgstrom | 235/95 C |

Primary Examiner—John M. Jillions
Attorney, Agent, or Firm—Robert C. Baker

[57] ABSTRACT

The use-registering reel for flexible tape has a pair of lateral disk-like members in spaced parallel relationship united to an axially centered core structure. The core structure includes an axial hub and a cylindrical tape-support member at its radially outer perimeter. Between the hub and tape-support member, within a radial segment of the core structure, is a walled housing having a transparent window. The housing is united to the core structure and undergoes orbital movement about the hub axis during rotation of the reel. A counter assembly is mounted in tamper-resistant condition in the housing for orbital movement with it. The counter assembly includes an actuatable indicating means for registering revolutions of the reel, an action means for actuating the indicating means responsively to rotation of said reel, and selective means responsive solely to the direction of rotation of said reel. The selective means effectively causes the indicating means to register revolutions of the reel in one predetermined direction only; and the registration is viewable through the aforenoted window.

15 Claims, 8 Drawing Figures

REEL TECHNOLOGY

This invention relates to reels, and more particularly, to use-registering reels for flexible tape, to such reels with tape thereon in condition for payout and simultaneous registration of the payout use, to methods of using such reels with simultaneous registration of such use, and to use-measuring means for reels.

Reels according to the invention are useful for registering or metering the usage of any flexible tape, and are especially useful for registering or metering the usage of movie tapes and magnetic tapes.

Much business is conducted on the basis of renting reusable tapes such as motion picture films or sound tapes. Those renting such tapes frequently base their rental fee on the number of times the renting party uses the tapes, that is, the number of runs made of the tape through a tape processing machine such as a movie projector or a magnetic tape replay machine. Unfortunately they have suffered much loss of revenue because of their inability to determine the amount of usage of a returned reel from mere inspection of it, and because of the tendency of some renters to under-report their usage, or falsely report only one use when two or three or more uses or "showings" were actually made.

Despite the longstanding need for some means for monitoring actual usage, without a representative of the rental party in attendance, no one insofar as is known has heretofore offered any practical solution to the problem. Instead, the loss of revenue from under-reporting has gone on unchecked and lamented, with hope for correction but no effective means for achieving it.

A simple effective solution to that problem is here provided. The solution takes the form of a new type of reel which nevertheless incorporates also the conventional features which are desirable in a reel, thus permitting these new reels to be used on existing projection or play-back equipment without alteration of the same.

In prior art unrelated to tape reels, there has been available for many years a variety of revolution counters such as odometers. They have been mounted or operably connected at a wheel axis to pick up and record revolutions, usually in digits of distance. The reel of this invention employs a revolution counter eccentrically mounted for orbital movement about the reel axis, without any operable connection to the reel axis, but nevertheless effective to register revolutions of the reel in one direction, such as the tape payout direction, without subtraction from the registration of payout use as the reel is rotated in the opposite direction, or rewind direction.

In summary, this invention provides a use-registering reel for flexible tape. The reel has a pair of lateral disk-like members in spaced parallel relationship and an axially centered core structure to which the disk-like members are united. The core structure comprises:

(a) an axial hub for fixing the reel on a horizontal reel-support shaft of a tape processing machine;

(b) a cylindrical tape-support member at the radially outer perimeter of the core structure; the tape-support member is between the disk-like members and is coaxially about the hub but spaced radially outward therefrom;

(c) wall means forming a housing within a radial segment of the core structure; thus the housing is eccentric to the axis of the hub and undergoes orbital movement about the axis during rotation of the reel; the wall means includes a transparent window at a lateral side of the reel; the housing is united to the core structure; and (d) a counter assembly mounted in tamper-resistant condition in the housing for orbital movement therewith during rotation of the reel; the counter assembly includes:

(i) actuatable indicating means for registering revolutions of the reel; the indicating means is viewable through the window of the housing at least during one predetermined direction of rotation of the reel, (ii) action means for actuating the indicating means responsively to rotation of the reel; and (iii) selective means responsive solely to the direction of rotation of the reel; the selective means is inoperative to disable the action means during rotation of the reel in the one predetermined direction and operative to disable the action means when the reel is rotated in the opposite direction; thus the counter effectively registers revolutions of the reel in the one predetermined direction only.

Additionally provided are reels having additional special features and advantageous structures and functions, as well as new methods for registering or metering or monitoring the use of reels, and improved use-measuring means for reels.

Figure 1:
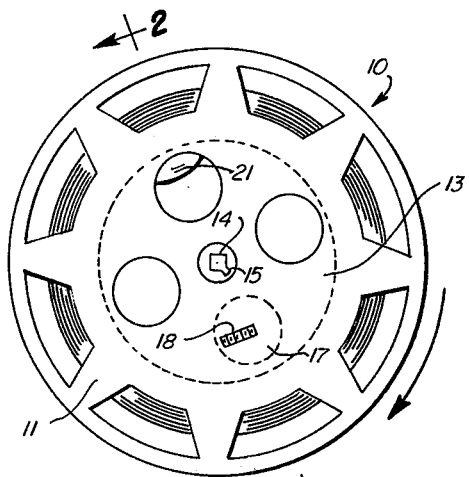
FIG. 1 is a schematic lateral side plan view of a reel of the invention.
Figure 2:
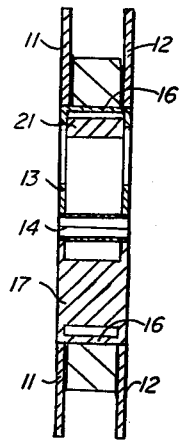
FIG. 2 is a schematic cross section taken on lines 2—2 of FIG. 1.

Referring to FIGS. 1 and 2, a reel 10 of the invention comprises a pair of lateral disk-like members 11 and 12 in spaced parallel relationship, and an axially centered core structure 13 to which the disk-like members are united. The core structure is generally circular, as are the disk-like members, and is considered "axially centered" in that it is centered not only at the axis for the annular disks 11 and 12, but also is centered between the point of the axis for each disk-like member. Thus, the axis of the core 13 is common to the axis for the annular disk-like members which occupy a lateral or side location, with core 13 radially inward from the perimeter of the annular disks 11 and 12.

As illustrated, neither the disk-like members nor the core structure need be entirely solid. Holes or openings may extend through either or both.

The core structure itself is equipped with an axial hub 14 about the axis for its rotation. The central hub 14 of the core is used for fixing the reel on a horizontal reel-support shaft of a tape processing machine. The reel-support shaft of tape machines frequently is rotatable, and the axial hub of the reel frequently is suitably equipped with a spline recess 15 for receiving a spline on the reel support shaft so as to cause the reel and shaft to be rotatable together. Other means for locking the hub for common rotation of the reel with the support shaft of a tape processing machine may be used.

At the radially outer perimeter of the core structure is a cylindrical tape-support member 16. It is located between the disk members 11 and 12, and is coaxially about the hub 14, but is radially out from the hub 14, with a space between the hub and the tape-support member 16. Usually, the member 16 will have some break in it, or an axially aligned slot opening, through which the end of the tape to be wound upon the reel is inserted and frictionally held as the tape is wound in overlapping convolutions on the reel.

According to this invention, the end of the tape placed on the reel may, if desired, be locked in position on the cylindrical tape-support member by any suitable means, such as an adhesive. Where such is done, several of the overlapping convolutions of the tape initially wound upon the core structure 13 should be free of intelligence or indicia useful to a party renting the reel of tape. Where such an extra unmarked length is employed, termination of the payout of tape from the reel is easily accomplished after complete passage of the intelligence or indicia portion through a tape processing machine, and before the payout of unmarked tape next to the core 16 places stress upon the end of it adhesively fixed to the core structure. While optional, this feature may be useful where suspicions arise that rental users are rewinding the tape on a different reel for repeated "showings", and then wind it upon the use-measuring reel of this invention for return. For detection purposes, the inner several convolutions of a winding of tape on a reel of this invention may be adhesively secured together by a line of adhesive easily torn or parted, but not easily restructured by the average user.

Within a radially segment of the core structure is a housing 17. Being in a radial segment, the housing 17 is not located at the axis of the hub 14 of the reel, but is eccentric thereto, and undergoes orbital movement about the axis of the hub during rotation of the reel. The housing is formed of walls which, for greatest security, should form a complete enclosure. One wall of the housing includes a transparent window 18 at a lateral side of the reel.

Importantly, the housing 17 is united to the core structure. Walls of the housing may in fact be common with other structural features of the core structure, such as, for example, a portion of the cylindrical tape-support member 16 or even the hub 14. In the most preferred embodiment, the housing is an integrally united part of the core structure, sealed therein, and is inseparable therefrom without damage to the core structure.

Optionally, however, as illustrated in FIG. 2, the housing 17 may be a discrete part of the core structure 13, (e.g., a capsule or canister), removably united to it. If such is desired, the reel of this invention also should include a locking means such as bolts 19 (extending into recesses in housing 17) for locking the housing to the core structure and within it. The locking means is suitably disengagable by means of a special key operable in key recesses 20.

Still further, if desired, the housing may optionally incorporate a further internal housing within it. The internal housing may be fixed within the main or external housing so as to be rotatable within it, or may be immovably united to it. Such variations of structure are usually needlessly complicated, but may be useful in instances where some features of the counter assembly selected for use are incorporated in a wall or part of the internal housing per se, and rotation between the internal housing and external or main housing is needed for counter operation.

Within the housing 17 is mounted a counter assembly, which should be completely enclosed in tamper resistent condition in the housing. It should be inaccessible to users of the reel. The counter assembly itself, like the housing, undergoes orbital movement during rotation of the reel about its axis. There is no connection between the axis of rotation of the reel and the counter assembly of the housing.

Before discussing the main parts of the counter assembly, attention is called to the weighted mass 21 in the core of the reel. This weighted mass is employed to balance or offset the added weight in the radial segment of the core occupied by the housing and counter assembly. Sufficient weight mass is used to accomplish reasonable dynamic balancing of the reel for uniform rotation of it about its axis when mounted on a tape processing machine.

While some counter assemblies useful for practicing the invention are known, and may take various forms, they, in all instances, include at least an actuatable indicating means for registering revolutions, an action means for actuating the indicating means, and a selective means responsive solely to the direction of rotation of the reel to cause counting in only one predetermined direction of rotation, without subtraction on reverse or opposite rotation.

Illustratively the indicating means 22 may comprise a plurality of digit or register wheels or bands movable about a common axis; and this feature is a well known one. Each indicator element has a series of digits from 0 through 9 on its outer periphery so as to provide a sequential display of those numbers along a predetermined radial segment from the shaft 23 about which they are mounted. The radial segment is oriented for viewing through window 18. The register bands or wheels are interconnected in any suitable operative manner to produce a consecutive display of numbers, illustratively from 1 to 10,000, or up to 100,000 or higher. The unit digit element (bearing number 4 in window 18 in FIg. 3) may be mounted for turning with the main shaft 23 for the indicating means, or for turning with an element such as gear 27 on that shaft; and all others will be rotatable about the axis of shaft 23. Any suitable mechanism may be employed between adjacent elements to effect counting registration. A suitable mechanism effects, for example, a single digit shift of the next higher wheel, e.g., the "tens" wheel, for each complete revolution of the lower wheel, e.g., the unit wheel. The hundreds wheel will be turned one digit by any suitable interconnection between it and the tens wheel for each complete revolution of the tens wheel, and so on, up through whatever number of indicator elements are incorporated in the indicating means. A variety of mechanical interconnections are known for accomplishing this type of counting registration. If desired, however, instead of employing indicating means having individual register wheels, one may employ a circular disk face as the indicating means, with a plurality of distinctly different pointers for indicating units, tens, hundreds, and the like. The basic internal operation for such a face display still requires operatively interconnected wheels or disks or analogous elements which control the relative degree of movement of the pointers.

The registration or metering on indicating means of the counter must be oriented for view through the window of the housing 18 aforementioned. This viewability of the indicating means must at least be possible during times the reel is rotated in the one predetermined direction of rotation for unwinding or payout of tape from it. Preferably the indicating means is viewable at all times through window 18, so as to permit observation of the registration of revolutions at all times.

Figure 3:
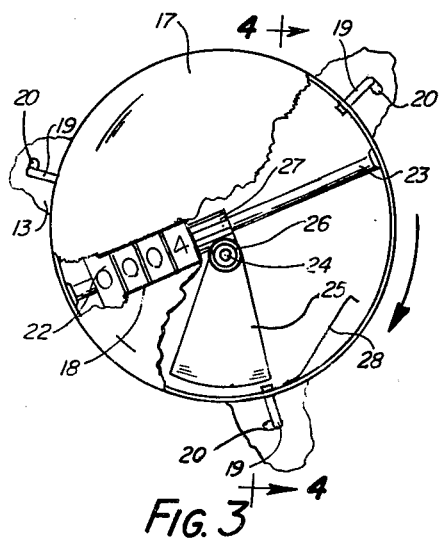
FIG. 3 is a schematic enlarged plan or lateral view, partially broken away, of a housing and use-registering means such as useful in the reel of FIG. 1, but with an added optional locking feature shown in broken away parts of a reel core structure adjacent the housing illustrated.
Figure 4:
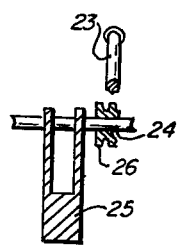
FIG. 4 is a schematic cross section taken on lines 4—4 of FIG. 3, with parts broken away.

Actuating the indicating means for registration of revolutions of the reel is accomplished through or by an action means which operates responsively to rotation of the reel. As shown in FIGS. 3 and 4, a suitable action means comprises a reel-revolution measuring means or shaft 24 and a pendulous weight 25 which powers the measuring means 24, and illustratively is immovably fixed thereto. Relative motion of the measuring means 24 is transmitted through any suitable gearing to the indicating means 22. For example, a worm 26 immovably fixed on measuring shaft 24 is intermeshed with a gear wheel 27 fixed to rotate the unit wheel of the indicating means.

In one embodiment, the measuring shaft 24 is suitably mounted centrally in the housing 17 in freely rotatable eccentric parallel relationship to the axis of the hub 14. The pendulous weight 25 tends to maintain itself in dependent relationship from shaft 24 as a result of gravity. This dependent relationship, however, may be altered where a selective means is employed to shift the pendulous weight under certain conditions.

The direction of rotation of the reel serves as the effective mechanism for operating the selective means. In other words, the selective means "senses" direction of rotation and operates responsively solely to the direction of rotation of the reel. Functionally, during rotation of the reel in one predetermined direction (such as a clockwise tape payout direction), the selective means is inoperative to disable the action means from its actuation of the indicating means of the counter. However, on rotation of the reel in the opposite direction (such as a counterclockwise rewind direction), the selective means becomes operable to disable the action means from its actuation of the indicating means of the counter.

In FIGS. 3 and 4, a leaf spring mounted on the internal wall of housing 17 is oriented to extend or project circumferentially outwardly from that wall, and to function as the selective means for the counter. During rotation of the reel in a clockwise direction, pendulum 25 causes the orbiting measuring shaft 24 to "rotate", in a relative sense, in a counterclockwise direction with respect to the orbiting housing 17. Actually, clockwise orbiting of the fixed housing 17 of the core structure 13 about the axis of the reel during rotation of the reel, causes the housing 17 to rotate one complete revolution for each orbit it makes, i.e. one revolution for each revolution of the reel. However, the measuring shaft 24, if analyzed with respect to a point totally outside the revolving reel, does not undergo rotation during such an orbit. The gravitational pendulous weight serves to maintain the measuring shaft in a stable non-rotating condition with respect to an outside point under these conditions. But because all other elements in the housing are rotated during orbital motion of the housing, there effectively is, relative to the other elements of the counter assembly, a "rotation" of the measuring shaft in a manner directly proportional to the rotation of the reel itself.

Figure 5:
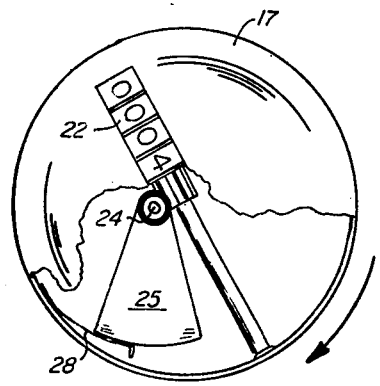
FIGS. 5 and 6 are schematic lateral views, partially broken away, showing different orientations for the housing and use-registering means illustrated in FIGS. 3 and 4.
Figure 6:
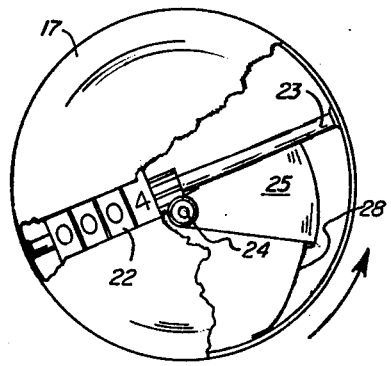

During clockwise rotation of the reel (see FIGS. 1, 3 and 5) the leaf spring 28 slides beneath the pendulous weight 25 and does not interfere with operation of the action means (pendulum 25, shaft 24, and gears 26 and 27) for actuating the indicating means 22 of the counter. But on reverse rotation of the reel, in a counterclockwise direction (see FIGS. 1, 3 and 6), the free end of the leaf spring 28 abuts against a flat or toothed edge of the pendulous weight 25, and lifts the pendulous weight 25. The free end of spring 28 remains so abutted against the pendulous weight 25 until the pendulous weight is elevated directly above the measuring shaft 24. When directly above the measuring shaft 24, or slightly moved beyond that point, the weight of the pendulous weight causes it to flip itself downwardly as a result of gravitational pull. This can cause a half revolution change on the registration of revolutions on the indicating means of the counter. But as continued counterclockwise rotation takes place, the half revolution change on the registration means is neutralized because the leaf spring catches up to the depending pendulum. This process is repeated for each counterclockwise revolution of the counter.

Thus, the registration of clockwise or payout revolutions on the indicating means 22 is essentially unaffected by rotation of the reel in the counterclockwise direction, and the counter effectively registers revolutions of the reel only in the one predetermined direction, without any substantial reduction of the revolutions so registered when the reel is rotated in the opposite direction.

Figure 7:
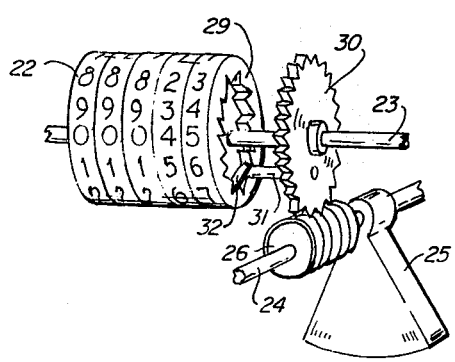
FIG. 7 is a schematic perspective view of an alternate use registering means.

In FIG. 7, there is illustrated a form of selective means which is characterized as comprising a clutch means. The "clutch" is interposed in the drive and driven elements between the measuring means 24 and the indicating means 22 of the counter. The shaft 23 for the register elements of the indicating means is equipped with one part of the "clutch", e.g., an internally toothed sprocket means operatively connected to or even united to the units element of the indicating means. Suitably, each tooth of the sprocket 29 has one side which is sloped or curved, and an opposite side which more or less extends or lies in the radial direction from the axis of sprocket 29. Spaced from sprocket 29, and suitably freely rotatable about shaft 23, is a sprocket actuating means, which may comprise a gear 30 driven by the worm 26. Mounted eccentrically on one side face of the gear 30, toward sprocket 29, is a flip or slip element in the nature of a leaf spring. A pin 31 projects from the face of the gear 30 at an eccentric location; and a leaf spring 32 extends from pin 31 in a generally circumferential direction. A reel containing the assembly of FIG. 7, in clockwise rotation, registers revolutions on the indicator means, but not in the reverse rotation. Orbital clockwise movement causes the leaf opening 32 to abut against a radially extending face of a tooth of sprocket 29 and to move sprocket 29 clockwise in FIG. 7 to effect indicator registration of revolutions. But on reverse rotation, the gear 30 driven by the worm 26 moves counterclockwise in FIG. 7; and the flip or slip element, or leaf spring 32, slides along the sloped surfaces of the teeth of the internal sprocket 29, without moving that sprocket. In this embodiment, sufficient friction for the mounting of the shaft 23 on which the register wheels are carried holds that shaft and the internal sprocket 29 against reverse rotation as the element 32 slips past the sprocket teeth during counterclockwise rotation. Instead of an internal sprocket as illustrated, an external one or a lateral sprocket surface may be used; and the sprocket actuator may comprise a disc or the like with a plurality of elements for slip and grip relationship with the sprocket, depending on direction of rotation.

Still other varied counter assemblies having the three essential functions aforenoted may be useful. The indicating means may be carried on or comprise the pendulous weight; the selective means may be incorporated in the shaft or in elements on the shaft for the pendulous weight, as for example by using worm gearing to shift to the pendulous weight responsively to the direction of reel rotation.

In all embodiments, the counter assembly is preferably inert to magnetic lines of force, so as to remain operable as described even when subjected to a magnetic field from a source external to the housing. It should not be disabled by a magnetic field, which might be attempted by one bent on fraud. The pendulous weight (and the other elements) is most preferably formed of material inert to a magnetic field, and illustratively may be formed of ceramic material, or a metallic material inert to magnetic force, such as brass and copper and the like. Even dense plastic may be employed as the pendulous weight for the extremely minute or small counter assemblies most preferably used in the practice of the invention. Indeed, all elements forming the structure of the counter assembly may, if desired, be molded out of organic plastic material.

Figure 8:
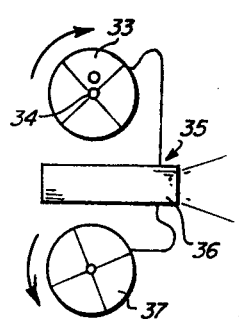
FIG. 8 is a schematic plan view of a tape processing machine equipped with a reel of the invention.

As schematically illustrated in FIG. 8, a reel of the invention 33, with flexible tape such as a movie film wound in overlapping convolutions about its cylindrical tape support member, is mounted at its hub by a user on a horizontal support shaft 35 of a tape processing machine such as a movie projector 36. Then movie tape from the reel is threaded through the projector, suitably with free loops on each side of the lens frame 36, as is conventional. The lead end is fixed to a take up reel 37. Play of the tape through the machine effectively rotates the reel in the one predetermined direction which effectively causes registration of the revolutions of the reel on the indicating means of the counter assembly. Simultaneously, the intelligence on the tape is displayed on a screen such as cinema screen. Once the tape is payed out for display of intelligence from it, rewinding of it upon the reel 33, from which it was payed out, is accomplished without the revolutions of rewinding causing any significant change in the registered revolutions, or the proportionate revolution indicia registered on the use-registering means of the reel.

It will be appreciated that use-registration of the revolutions of a reel in payout of tape need not constitute a literal counting and recordation of each revolution. Rather, as used herein, the concept of registering the use by reference to the revolutions of the reel is intended to encompass any selected registration of revolutions on the indicator means, whether a single unit on the indicator means one reel revolution, or ten, or even a hundred revolutions. In each instance, the revolutions of the reel are being registered; and the gearing of the counter assembly may be selected to satisfy the standard of use registration of reel revolutions as may be desired by those practicing the invention.

That which is claimed is:

1. A use-registering reel for flexible tape, said reel having a pair of lateral disk-like members in spaced parallel relationship and an axially centered core structure to which said disk-like members are united, said core structure comprising
   (a) an axial hub for fixing said reel on a horizontal reel-support shaft of a tape processing machine,
   (b) a cylindrical tape-support member at the radially outer perimeter of said core structure, said tape-support member being between said disk-like members and coaxially about said hub but spaced radially outward therefrom,
   (c) wall means forming a housing within a radial segment of said core structure, whereby said housing is eccentric to the axis of said hub and undergoes orbital movement about said axis during rotation of said reel, said wall means including a transparent window at a lateral side of said reel, said housing being united to said core structure, and
   (d) a counter assembly mounted in tamper-resistant condition in said housing for orbital movement therewith during rotation of said reel, said counter assembly including
      (i) actuatable indicating means for registering revolutions of said reel, said indicating means being viewable through said window of said housing at least during one predetermined direction of rotation of said reel,
      (ii) action means for actuating said indicating means responsively to rotation of said reel, and
      (iii) selective means responsive solely to the direction of rotation of said reel, said selective means being inoperative to disable said action means during rotation of said reel in said one predetermined direction and operative to disable said action means when said reel is rotated in the opposite direction, whereby said counter effectively registers revolutions of said reel in said one predetermined direction only.

2. The reel of claim 1 wherein said housing is an integrally united part of said core structure inseparable therefrom without damage to said core structure.

3. The reel of claim 1 additionally comprising locking means removably uniting said housing to said core structure, said locking means being disengageable by key means.

4. The reel of claim 1 wherein said counter assembly comprises materials inert to magnetic lines of force, and thereby not disabled in its operation by a magnetic field from a source external to said housing.

5. The reel of claim 1 additionally comprising a weight mass united to said reel radially opposite said housing, said weight mass being sufficient to balance said reel for dynamically uniform rotation.

6. The reel of claim 1 wherein said action means of said counter assembly comprises a pendulous weight.

7. The reel of claim 6 wherein said selective means comprises a leaf spring.

8. The reel of claim 6 wherein said selective means comprises clutch means.

9. The reel of claim 1 wherein said action means of said counter assembly comprises a reel-revolution measuring means mounted in said housing in freely rotatable eccentric parallel relationship to the axis of said hub, and a pendulous weight which powers said measuring means.

10. The reel of claim 9 wherein said pendulous weight is magnetically inert.

11. The reel of claim 9 wherein said selective means comprises a leaf spring mounted to extend from an internal wall of said housing so as to yield responsively to said pendulous weight during rotation of said reel in said one predetermined direction, to thereby allow said pendulous weight to remain gravitationally oriented, said leaf spring being unyielding when said reel is rotated in said opposite direction and serving to move said pendulous weight into nongravitationally oriented positions.

12. The reel of claim 9 wherein said selective means comprises clutch means between said measuring shaft and said indicating means, said clutch means comprising a slip element which disables said action means only when said reel is rotated in said opposite direction.

13. The reel of claim 1 additionally comprising a flexible tape wound in overlapping convolution about said cylindrical tape-support member of said reel.

14. The method of registering the use of a reel of tape, having an axially centered core structure equipped with a window eccentrically oriented at a lateral side edge thereof and a counter assembly mounted eccentrically in tamper-resistant condition within said core structure for orbital movement during rotation of said reel, said counter assembly including actuatable indicating means for registering revolutions of said reel, said indicating means being viewable through said window at least during one predetermined direction of rotation of said reel, action means for actuating said indicating means responsively to rotation of said reel, and selective means responsive solely to the direction of rotation of said reel, said selective means being inoperative to disable said action means during rotation of said reel in said one predetermined direction and operative to disable said action means when said reel is rotated in the opposite direction, said method comprising mounting said reel on a horizontal support shaft of a tape processing machine, withdrawing said tape from said reel through said tape processing machine, whereby said reel is rotated in said one predetermined direction and revolutions of said reel in said one predetermined direction are registered on said indicating means of said reel, and rewinding said withdrawn tape onto said reel by rotating said reel in a direction opposite to said one predetermined direction, whereby the registration of revolutions of said reel on said indicating means of said reel as a result of said unwinding step is maintained on said indicating means during said rewinding step.

15. A use-registering reel for flexible tape, said reel having a pair of lateral disk-like members in spaced parallel relationship and an axially centered core structure to which said disk-like members are united, all axially parallel portions of said reel being substantially no greater in width than said disk-like members, said core structure comprising (a) an axial hub for fixing said reel on a horizontal reel-support shaft of a tape processing machine, (b) a cylindrical tape-support member at the radially outer perimeter of said core structure, said tape-support member being between said disk-like members and coaxially about said hub but spaced radially outward therefrom, (c) wall means forming an enclosed housing within a radial segment of said core structure, whereby said housing is eccentric to the axis of said hub and undergoes orbital movement about said axis during rotation of said reel, said wall means including a transparent window at a lateral side of said reel, said housing being an integrally united part of said core structure inseparable therefrom without damage to said core structure, (d) a counter assembly mounted in tamper-resistant condition in said housing for orbital movement therewith during rotation of said reel, said counter assembly including (i) actuatable indicating means for registering revolutions of said reel, said indicating means being viewable through said window of said housing at least during one predetermined direction of rotation of said reel, (ii) action means for actuating said indicating means responsively to rotation of said reel, said action means comprising a reel revolution measuring means mounted in said housing in freely rotatable eccentric parallel relationship to the axis of said hub and a magnetically inert pendulous weight which powers said measuring means, and (iii) selective means responsive solely to the direction of rotation of said reel, said selective means being inoperative to disable said action means during rotation of said reel in said one predetermined direction and operative to disable said action means when said reel is rotated in the opposite direction, whereby said indicating means effectively registers revolutions of said reel in said one predetermined direction only, with no substantial reduction of the revolutions so registered when said reel is rotated in said opposite direction, and (e) a weight mass united to said reel radially opposite said housing, said weight mass being sufficient to substantially balance said reel for dynamically uniform rotation.

* * * * *